(12) United States Patent
Miyazaki

(10) Patent No.: US 9,396,022 B2
(45) Date of Patent: Jul. 19, 2016

(54) INFORMATION PROCESSING SYSTEM

(71) Applicant: FUJITSU LIMITED, Kawasaki-shi, Kanagawa (JP)

(72) Inventor: Keiji Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/566,030

(22) Filed: Dec. 10, 2014

(65) Prior Publication Data

US 2015/0234673 A1 Aug. 20, 2015

(30) Foreign Application Priority Data

Feb. 19, 2014 (JP) .................................. 2014-029932

(51) Int. Cl.
*G06F 9/455* (2006.01)
*G06F 9/48* (2006.01)

(52) U.S. Cl.
CPC .......... *G06F 9/4856* (2013.01); *G06F 9/45558* (2013.01); *G06F 2009/45583* (2013.01); *G06F 2009/45595* (2013.01)

(58) Field of Classification Search
CPC . G06F 9/5077; G06F 9/4856; G06F 9/45533; G06F 9/45558; G06F 11/1484; G06F 13/4022
See application file for complete search history.

(56) References Cited

U.S. PATENT DOCUMENTS

| | | | | |
|---|---|---|---|---|
| 7,620,955 B1 * | 11/2009 | Nelson | ................. | G06F 9/45533 703/26 |
| 2011/0225285 A1 * | 9/2011 | Patel | ..................... | G06F 9/4856 709/224 |
| 2011/0238820 A1 * | 9/2011 | Matsuoka | ............. | G06F 9/5077 709/224 |
| 2011/0246669 A1 | 10/2011 | Kanada et al. | | |
| 2011/0268113 A1 | 11/2011 | Suzuki et al. | | |
| 2012/0030674 A1 * | 2/2012 | Mundkur | ............ | G06F 13/4022 718/1 |
| 2012/0084782 A1 * | 4/2012 | Chou | .................. | G06F 11/1484 718/102 |
| 2012/0096459 A1 * | 4/2012 | Miyazaki | ............ | G06F 9/45558 718/1 |
| 2013/0290468 A1 * | 10/2013 | Ramakrishnan | ...... | G06F 9/4856 709/213 |

FOREIGN PATENT DOCUMENTS

| | | |
|---|---|---|
| JP | 2010/257209 | 11/2010 |
| JP | 2011/210032 | 10/2011 |
| JP | 2012/088863 | 5/2012 |
| WO | WO 2010/123140 | 10/2010 |

* cited by examiner

*Primary Examiner* — Tuan Vu
(74) *Attorney, Agent, or Firm* — Staas & Halsey LLP

(57) ABSTRACT

A first device starts to transfer memory data related to a virtual machine running on the first device to a second device connected to the first device via a switch device. When an accumulated amount of transferred memory data exceeds a first threshold, the first device stops packet transmission performed by the virtual machine and transmits a prior shut-down notice to the second device. The first device shuts down the virtual machine when the accumulated amount exceeds a second threshold. The second device transmits, upon receiving the prior shut-down notice, a first control message to the switch device and the first device and causes a virtual network interface to start reception of packets destined for the virtual machine. When the memory transfer is completed, the second device starts up the virtual machine to start the packet transmission and outputs packets held in the virtual network interface to the virtual machine.

5 Claims, 14 Drawing Sheets

| MAC ADDRESS | PORT | TIME |
|---|---|---|
| 00:11:22:33:44:55 | 10 | 201310150910 |
| 66:77:88:99:aa:bb | 21 | 201311100620 |
| ... | ... | ... |

INFORMATION PROCESSING SYSTEM

CROSS-REFERENCE TO RELATED APPLICATION

This application is based upon and claims the benefit of priority of the prior Japanese Patent Application No. 2014-029932, filed on Feb. 19, 2014, the entire contents of which are incorporated herein by reference.

FIELD

The embodiments discussed herein are related to an information processing system.

BACKGROUND

Virtual machine migration (VM migration) is known in which a virtual machine running on a server is migrated to another server. For example, a migration source server transfers data (memory data) stored in a memory used by a virtual machine to be migrated, to a migration destination server. The migration destination server starts up the virtual machine after the memory transfer from the migration source server is completed.

A data center consumes an enormous amount of electric power because a large number of servers are operated in the data center. Therefore, in the data center, a running virtual machine is migrated so that a server on which no virtual machine is running is made and shut down. Thus, electric power in the data center is saved.

In the course of VM migration, the virtual machine to be migrated is shut down and restarted in another server after a few seconds to a few tens of seconds. During the few seconds, for which the virtual machine is not running, packets to be received by the virtual machine are discarded. Therefore, a virtual machine that provides service in which the packet discard is not allowed may not be migrated freely. Thus, it is difficult to achieve saving of the electric power or perform the maintenance in a server that runs such a virtual machine.

As a technology by which the packet discard is suppressed, VM migration using a migration buffer is known. For example, a migration source server uses the migration buffer to perform the VM migration, and receives a packet destined for a virtual machine to be migrated, into the migration buffer. When memory transfer of the virtual machine is completed and the virtual machine is restarted in a migration destination server, the migration source server transfers the packets stored in the migration buffer to the migration destination server.

Related techniques are disclosed, for example, in International Publication Pamphlet No. WO2010/123140, Japanese Laid-open Patent Publication No. 2012-88863, Japanese Laid-open Patent Publication No. 2011-210032, and Japanese Laid-open Patent Publication No. 2010-257209.

However, in the above-described technology, when an amount of packets stored in the migration buffer is large, or when the communication speed between the servers is slow, the transfer time of the packets becomes long. Therefore, the migrated virtual machine is not allowed to start processing related to packets until the packet transfer is completed. That is, the packet processing by the migrated virtual machine is delayed.

SUMMARY

According to an aspect of the present invention, provided is an information processing system including a first information processing device and a second information processing device connected to the first information processing device via a switch device. The first information processing device includes a first processor for performing migration of a virtual machine running on the first information processing device to the second information processing device. The first processor is configured to start memory transfer for transferring memory data related to the virtual machine to the second information processing device. The first processor is configured to stop, when an accumulated amount of transferred memory data exceeds a first threshold, packet transmission performed by the virtual machine and transmit a prior shut-down notice to the second information processing device. The prior shut-down notice notifies that the virtual machine is to be shut-down. The first processor is configured to receive a first control message including address information of the virtual machine. The first processor is configured to shut down the virtual machine when the accumulated amount exceeds a second threshold. The second information processing device includes a second processor. The second processor is configured to transmit, upon receiving the prior shut-down notice from the first information processing device, the first control message to the switch device and the first information processing device. The second processor is configured to cause a virtual network interface to start reception of packets destined for the virtual machine. The second processor is configured to start up, when the memory transfer is completed, the virtual machine to start the packet transmission. The second processor is configured to output packets held in the virtual network interface to the virtual machine.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of information stored in an FDB;

DESCRIPTION OF EMBODIMENTS

Embodiments of an information processing system are described below in detail with reference to drawings. The embodiments are not limited by such description. The embodiments may be combined as appropriate to be consistent.

First Embodiment

Figure 1:
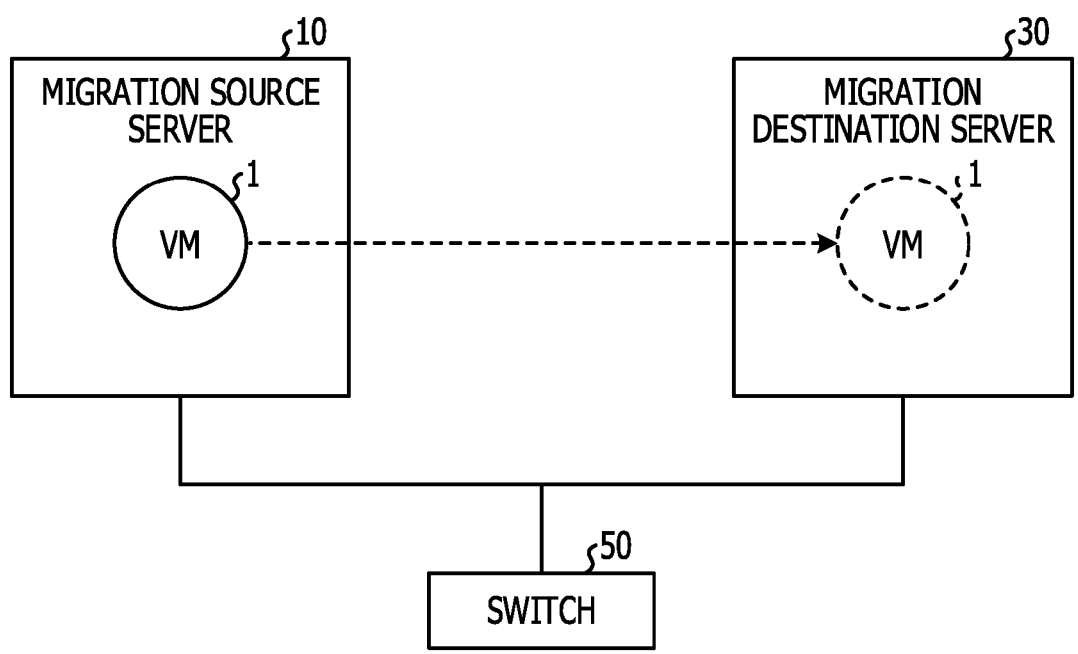
FIG. 1 is a diagram illustrating an exemplary configuration of an information processing system according to a first embodiment.

FIG. 1 is a diagram illustrating an exemplary configuration of an information processing system according to a first embodiment. As illustrated in FIG. 1, the information processing system includes a migration source server 10, a migration destination server 30, and a switch 50. The migration source server 10 and the migration destination server 30 are connected to each other through the switch 50. In the present embodiment, an example is described in which a virtual machine (VM) 1 is migrated from the migration source server 10 to the migration destination server 30.

The migration source server 10 is a physical server that runs the VM 1. The VM 1 is a VM that runs by using a resource of the physical server. The migration destination server 30 is a physical server that is a destination of the migration of the VM 1.

The switch 50 is a relay device that relays communication between servers and relays external communication of each of the servers. The switch 50 is, for example, a switching hub or the like. For example, the switch 50 relays a packet transmitted from the VM 1 to the migration destination server 30, and relays a packet transmitted from the migration destination server 30 to the VM 1. In addition, the switch 50 relays, to the VM 1, a packet which is transmitted from an external server or VM and destined for the VM 1.

Figure 2:
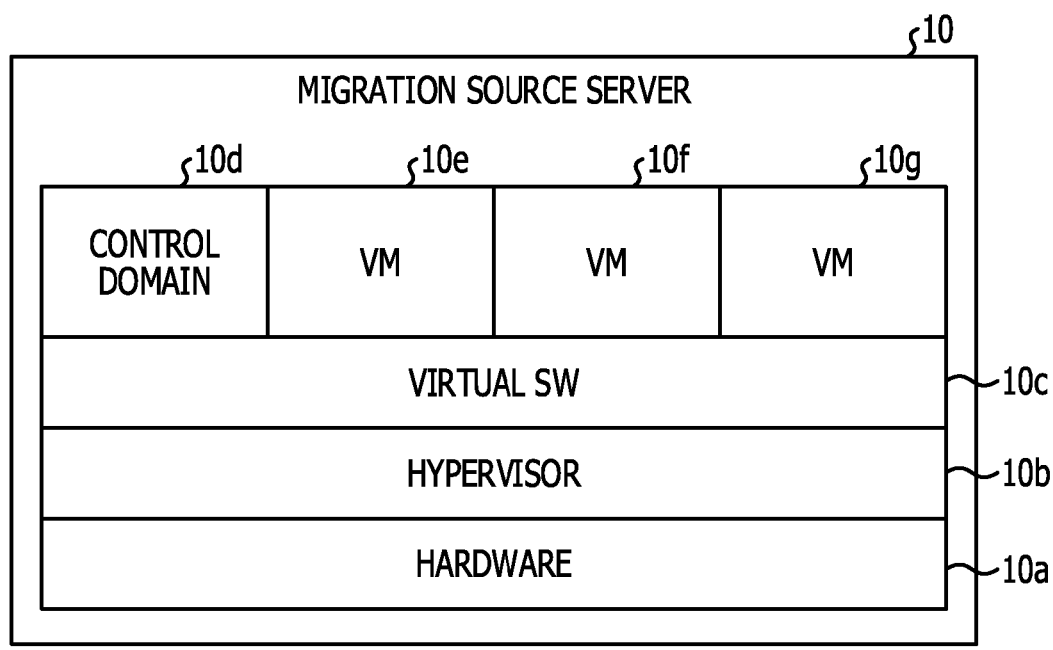
FIG. 2 is a diagram illustrating an exemplary layer structure of a server according to the first embodiment.

FIG. 2 is a diagram illustrating an exemplary layer structure of the server according to the first embodiment. The migration source server 10 and the migration destination server 30 illustrated in FIG. 1 have similar structures, so that the description is made here using the migration source server 10 as an example.

As illustrated in FIG. 2, the migration source server 10 includes hardware 10a, a hypervisor 10b, a virtual switch (SW) 10c, a control domain 10d, a VM 10e, a VM 10f, and a VM 10g.

The virtual SW 10c, the control domain 10d, the VM 10e, the VM 10f, and the VM 10g are implemented when the hypervisor 10b is executed.

The hardware 10a includes a central processing unit (CPU), a memory, a disk, a network interface card, and the like. The hypervisor 10b is software for controlling each of the VMs by assigning a virtual memory and a virtual processor to the VM. For example, start-up and shut-down of the VM, migration of the VM, and the like are performed by executing the hypervisor 10b.

The virtual SW 10c is a virtual switching hub or the like implemented when the hypervisor 10b is executed, and controls communication between VMs in the same server and communication between VMs in different servers. The control domain 10d is a virtual machine that controls an access to a network or a disk from a VM. Each of the VMs is a virtual machine implemented when the hypervisor 10b is executed.

For example, a packet transmitted from each of the VMs is received by the control domain 10d through the virtual SW 10c, and is transmitted to a destination through the virtual SW 10c or the network interface card by the control domain 10d. A packet destined for each of the VMs is also received by the control domain 10d through the network interface card and the like, and transmitted to a destination through the virtual SW 10c by the control domain 10d.

Similarly, a disk access from each of the VMs is received by the control domain 10d through the virtual SW 10c, and executed by the control domain 10d. A response for the disk access is received by the control domain 10d, and transmitted to the VM that is the access source through the virtual SW 10c by the control domain 10d.

The execution environment of VMs illustrated in FIG. 2 is merely an example and execution environments of VMs according to the embodiments are not limited to the illustrated environment. For example, software other than the hypervisor may be used. In addition, as the control scheme of a VM, various schemes such as a hypervisor type and a host type may be used.

Figure 3:
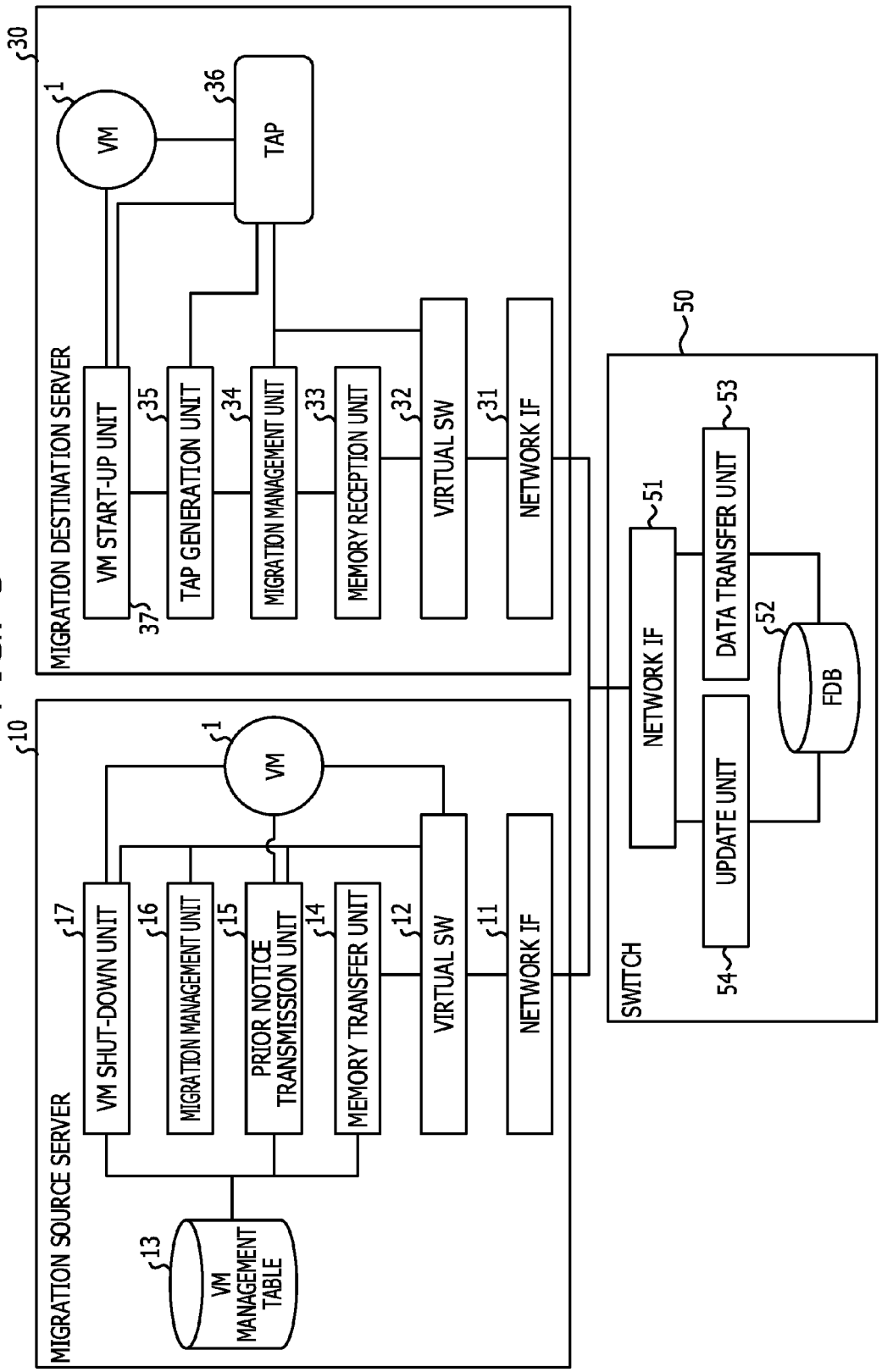
FIG. 3 is a diagram illustrating an exemplary functional configuration of the information processing system according to the first embodiment.

FIG. 3 is a diagram illustrating an exemplary functional configuration of the information processing system according to the first embodiment. Each of the functional configurations of the migration source server 10, the migration destination server 30, and the switch 50 is described below. Here, for illustrative purposes, the functional configuration of the migration source server 10 and the functional configuration of the migration destination server 30 are described separately. However, both of the servers include respective function units.

As illustrated in FIG. 3, the migration source server 10 includes a network interface (IF) 11, a virtual SW 12, a VM management table 13, and four processing units, that is, a memory transfer unit 14, a prior notice transmission unit 15, a migration management unit 16, and a VM shut-down unit 17. The migration source server 10 runs the VM 1 by using these units. The memory transfer unit 14, the prior notice transmission unit 15, the migration management unit 16, and the VM shut-down unit 17 are implemented when the hypervisor 10b is executed.

The network IF 11 is a physical interface, and is, for example, a network interface card (NIC) or the like. An Internet Protocol (IP) address is set to the network IF 11, and the network IF 11 performs communication using the IP address.

For example, the network IF 11 receives a packet destined for the VM 1, and outputs the received packet to the virtual SW 12. The packet is received by the VM 1 through the virtual SW 12. The network IF 11 receives a packet of memory transfer or the like transmitted from each of the processing units through the virtual SW 12, and outputs the received packet to the destination.

The virtual SW 12 is a virtual switch implemented when the hypervisor 10b is executed. The virtual SW 12 corresponds to the virtual SW 10c illustrated in FIG. 2. The virtual SW 12 relays packets transmitted and received between VMs.

For example, the virtual SW 12 outputs, to the network IF 11, a packet transmitted from each of the processing units or the VM 1. The virtual SW 12 receives, from the network IF 11, a packet destined for each of the processing units or the VM 1 and outputs the received packet to the destination.

Figure 4:
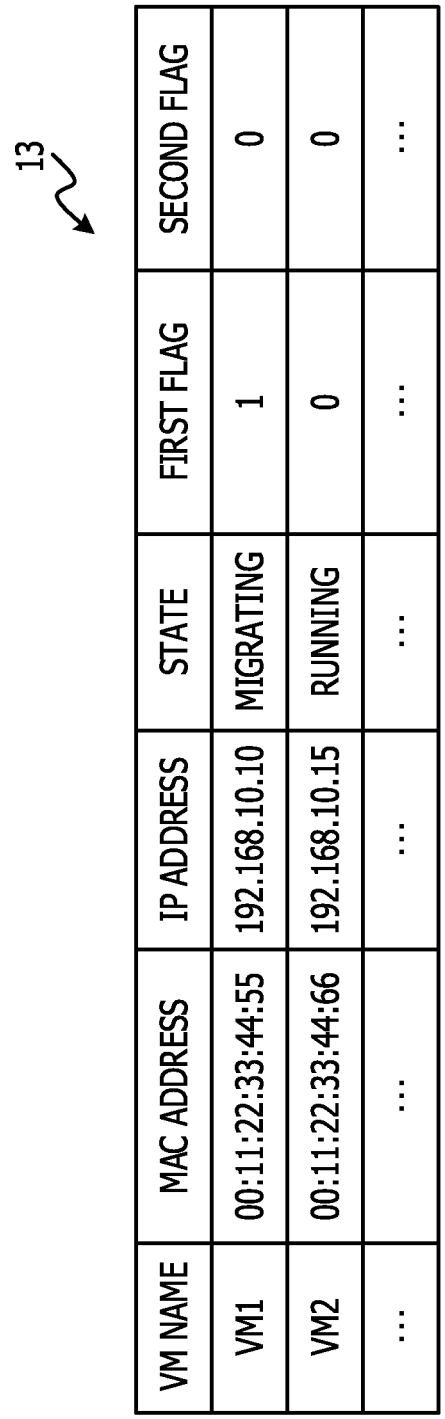
FIG. 4 is a diagram illustrating an example of information stored in a VM management table.

The VM management table 13 is a table that stores information on VMs. The VM management table 13 is stored in a memory or a disk included in the hardware 10a illustrated in FIG. 2. FIG. 4 is a diagram illustrating an example of information stored in the VM management table.

As illustrated in FIG. 4, the VM management table 13 has columns of "VM name", "MAC address", "IP address", "state", "first memory transfer amount threshold flag" ("first flag"), and "second memory transfer amount threshold flag" ("second flag") in association with one another.

"VM name" is an identifier used to identify a VM. For example, a guest name or the like is set to the "VM name" column. "MAC address" is a media access control (MAC) address of the VM. "IP address" is an IP address of the VM. "State" is information indicating a state of the VM. For example, "running" is set to the "state" column when the VM is running, "shut-down" is set to the "state" column when the VM is shut down, and "migrating" is set to the "state" column when the VM is being migrated.

"First flag" is information indicating whether or not an accumulated amount (accumulated memory transfer amount) of transferred memory data of the VM under migration exceeds a first memory transfer amount threshold (first threshold). "1" is set to the "first flag" column when the accumulated memory transfer amount exceeds the first threshold. "0" is set to the "first flag" column when the accumulated memory transfer amount does not exceed the first threshold. "Second flag" is information indicating whether or not the accumulated memory transfer amount of the VM under migration exceeds a second memory transfer amount threshold (second threshold). "1" is set to the "second flag" column when the accumulated memory transfer amount exceeds the second threshold. "0" is set to the "second flag" column when the accumulated memory transfer amount does not exceed the second threshold. The accumulated memory transfer amount is an amount of memory data that has already been transferred to the migration destination server 30. Here, memory data updated after transferred is to be retransferred, and thus, is treated as not yet transferred. Therefore, a total amount of memory data to be transferred is a sum of an accumulated memory transfer amount and an amount of memory data (remaining memory data) which is not yet transferred. The first threshold and the second threshold are described later in detail.

FIG. 4 indicates that a MAC address "00:11:22:33:44:55" and an IP address "192.168.10.10" are set to a VM named VM1. VM1 is being migrated. The accumulated memory transfer amount exceeds the first threshold, but does not exceed the second threshold.

The memory transfer unit 14 performs memory transfer during the migration of a VM. For example, the memory transfer unit 14 performs the migration of the VM in accordance with an instruction from an administrator or the like, or schedule specified beforehand. For example, the memory transfer unit 14 copies data (memory data) stored in a memory area used by the VM 1 to be migrated. The memory transfer unit 14 sets "migrating" to the "state" column corresponding to the VM 1 to be migrated, in the VM management table 13.

First, the memory transfer unit 14 transfers all pieces of data in the corresponding memory area, to the migration destination server 30. At next transfer timing, the memory transfer unit 14 merely transfers the updated portion updated after the last transfer, to the migration destination server 30. At further transfer timing, the memory transfer unit 14 also merely transfers the updated portion updated after the last transfer, to the migration destination server 30. As described above, the memory transfer unit 14 merely transfers the updated portion, to the migration destination server 30 until the VM 1 to be migrated is shut down.

The format of the memory transfer message transmitted by the memory transfer unit 14 includes an IP address of the migration source server, an IP address of the migration destination server, an IP address of the VM to be migrated, a message classification, a message type, and the data to be transferred. To the message classification, an identifier indicating memory transfer is set. To the message type, an identifier indicating one of "start of memory transfer", "midstream of memory transfer", "completion of memory transfer", and "cancel of memory transfer".

When an accumulated amount of data transferred by the memory transfer unit 14 exceeds the first threshold, the prior notice transmission unit 15 stops packet transmission by the VM 1 to be migrated and transmits a prior shut-down notice for preannouncing shut-down of the VM 1 to the migration destination server 30.

For example, the prior notice transmission unit 15 determines how close the memory transfer is to its completion. When it is determined that the memory transfer is approaching its completion to some extent, the prior notice transmission unit 15 causes the VM 1 to stop packet transmission and performs transmission of the prior shut-down notice. In addition, the prior notice transmission unit 15 sets "1" to the "first flag" column corresponding to the VM 1, in the VM management table 13.

A memory transfer amount threshold is determined based on a total amount of memory data to be transferred and a transfer progress level threshold. For example, when it is assumed that the total amount of memory data to be transferred is 4 GB and a first transfer progress level threshold is 80%, the first threshold becomes 4 GB×0.8=3.2 GB. In this case, the prior notice transmission unit 15 transmits the prior shut-down notice to the migration destination server 30 when the accumulated memory transfer amount exceeds 3.2 GB.

The format of the prior shut-down notice transmitted by the prior notice transmission unit 15 includes an IP address of the migration source server, an IP address of the migration destination server, an IP address of the VM to be migrated, a message classification, a message type, and the data to be transferred. To the message classification, the identifier indicating memory transfer is set. To the message type, an identifier indicating a shut-down notice is set.

The migration management unit 16 manages the state of the VM. For example, the migration management unit 16 monitors the migration state and the memory transfer state of the VM 1, and detects a migration failure and a transfer failure. The migration management unit 16 receives a gratuitous address resolution protocol (GARP) message transmitted from the migration destination server 30, through the switch 50. The migration management unit 16 notifies the VM shut-down unit 17 of the reception of the GARP message.

Upon receiving a GARP message and determining that the memory transfer is approaching its completion, the VM shut-down unit 17 shuts down the VM 1. For example, after receiving from the migration destination server 30 a GARP message including address information of a VM 1 to be migrated, the VM shut-down unit 17 shuts down the VM 1 upon determining that the accumulated data amount of the memory transfer exceeds the second threshold. In addition, The VM shut-down unit 17 sets "1" to the "second flag" column corresponding to the VM 1, in the VM management table 13.

The second threshold is set from the same viewpoint as the first threshold, and may be the same as the first threshold, but it is preferable that the second threshold is larger than the first threshold.

For example, when it is assumed that total amount of memory data to be transferred is 4 GB, the first transfer progress level threshold is 80%, and the second transfer progress level threshold is 90%, the first threshold becomes 4 GB×0.8=3.2 GB and the second threshold becomes 4 GB×0.9=3.6 GB. In this case, after receiving the GARP message, the VM shut-down unit 17 shuts down the VM 1 upon determining that the memory transfer amount exceeds 3.6 GB.

As illustrated in FIG. 3, the migration destination server 30 includes a network IF 31, a virtual SW 32, and four processing units, that is, a memory reception unit 33, a migration management unit 34, a TAP generation unit 35, and a VM start-up unit 37. By using these units, the migration destination server 30 causes the VM 1 to be migrated from the migration source server 10, and runs the VM 1. The memory reception unit 33, the migration management unit 34, the TAP generation unit 35, and the VM start-up unit 37 are implemented when the hypervisor 10b is executed.

The network IF 31 is a physical interface, similar to the network IF 11. An IP address is set to the network IF 31, and the network IF 31 performs communication using the IP address. The virtual SW 32 is a virtual switch implemented when the hypervisor 10b is executed, similar to the virtual SW 12. The virtual SW 32 relays packets transmitted and received between VMs.

The memory reception unit 33 receives memory data of the VM 1 to be migrated, from the migration source server 10, and stores the memory data in a memory of the migration destination server 30. For example, the memory reception unit 33 stores memory data in the memory of the migration destination server 30 each time the memory data is received from the migration source server 10. If any memory data is already stored in a memory area to be filled with received memory data, the memory reception unit 33 updates the memory area with the newly received memory data.

The migration management unit 34 transmits a GARP message including address information of the VM 1 to the switch 50 and the migration source server 10 upon receiving a prior shut-down notice. In addition, the migration management unit 34 requests the TAP generation unit 35 to generate a TAP 36 which is a virtual network interface used to communicate with a user process. For example, the migration management unit 34 performs transmission of the GARP message by broadcast or the like.

Upon receiving a packet destined for the VM 1 after the TAP 36 has been generated, the migration management unit 34 causes the TAP 36 to hold the packet. The migration management unit 34 may obtain the address information of the VM 1 by setting from the administrator or a notification from the migration source server 10.

The transmitted GARP message includes a hardware classification, a protocol, a hardware address length (HLEN), a protocol address length (PLEN), operation information, a transmission source MAC address, a transmission source IP address, a transmission destination MAC address, and a transmission destination IP address.

To the "hardware classification", a fixed value uniquely identified by the network is set. For example, "0x0001" is set in a case of the Ethernet (registered trademark). The "protocol" is information indicating the type of a higher-level protocol compatible with the address resolution protocol (ARP). For example, a fixed value "0x0800" is set to the "protocol" in a case of the IP network. The "HLEN" is information used to specify the length of a MAC address. For example, a fixed value "6" is set to the "HLEN". The "PLEN" is information indicating the length of address information used in the higher-level protocol. For example, a fixed value "4" is set to the "PLEN".

The "operation information" is information used to specify whether an ARP request or a response to an ARP request. For example, a fixed value "1" is set to the "operation information" in a case of an ARP request. To the "transmission source MAC address", a MAC address of the VM 1 targeted by the GARP request is set. To the "transmission source IP address", an IP address of the VM 1 targeted by the GARP request is set. To the "transmission destination MAC address", information identical to that of "transmission source MAC address" is set. To the "transmission destination IP address", information identical to that of "transmission source IP address" is set.

The TAP generation unit 35 generates a TAP 36 upon receiving a TAP generation instruction from the migration management unit 34. For example, the TAP generation unit 35 generates a TAP 36 in the virtual SW 32 or generates a TAP 36 so as to be connected to the virtual SW 32. As a further example, the TAP generation unit 35 may open a buffer secured beforehand.

The TAP generation unit 35 notifies the migration management unit 34 of the generation of the TAP 36. As a result, upon receiving a packet destined for the VM 1, the migration management unit 34 may cause the TAP 36 to temporarily hold the packet.

After the memory transfer has been completed, the VM start-up unit 37 starts up the VM 1 to start packet transmission and outputs the packets held in the TAP 36 to the VM 1. For example, when the completion of the memory transfer is notified from the memory reception unit 33, the VM start-up unit 37 allocates a virtual processor and a virtual memory to the VM 1 using the hardware and starts up the VM 1. The VM 1 starts the packet processing by receiving the packets held in the TAP 36 and receiving a start instruction of packet transmission from the VM start-up unit 37.

Upon receiving a completion notification of the memory transfer from the migration source server 10 or determining absence of the memory transfer for a predetermined time period, the memory reception unit 33 determines that the memory transfer has been completed, and notifies the VM start-up unit 37 of the completion of the memory transfer.

As illustrated in FIG. 3, the switch 50 includes a network IF 51, a forwarding database (FDB) 52, a data transfer unit 53, and an update unit 54.

The network IF 51 is a physical interface such as a port. The network IF 51 receives a prior shut-down notice and memory transfer completion notification from the migration source server 10. In addition, the network IF 51 receives a GARP message from the migration destination server 30. Further, the network IF 51 receives a packet destined for the VM 1, from an external server or the like.

The FDB 52 is a forwarding database storing transfer destinations of packets and the like. FIG. 5 is a diagram illustrating an example of information stored in the FDB. As illustrated in FIG. 5, each entry of the FDB 52 has columns of "MAC address", "port", and "time" in association with one another.

The "MAC address" is a MAC address as a destination of a packet. The "port" is a port number of a port used to output a packet having a destination identified by the MAC address. The "time" of an entry is a time at which the entry is updated.

In a case of the leading entry of FIG. 5, it is indicated that a packet destined for a MAC address "00:11:22:33:44:55" is output from a port having a port number "10". It is also indicated that this entry is updated at 9:10 on Oct. 15, 2013.

The data transfer unit 53 transfers a received packet on the basis of information stored in the FDB 52. For example, upon receiving a packet destined for the MAC address "00:11:22:33:44:55", the data transfer unit 53 identifies the port having a port number "10" as the output port with reference to the FDB 52 illustrated in FIG. 5. Then, the data transfer unit 53 outputs the received packet from the port having a port number "10".

Upon receiving a GARP message in which a broadcast address is specified, the data transfer unit 53 transfers the GARP message by broadcast through the network IF 51. As a result, the GARP message transmitted from the migration destination server 30 is received by the migration source server 10.

The update unit 54 updates the FDB 52. For example, upon receiving a GARP message, the update unit 54 identifies a transmission source MAC address included in the GARP message and a port number of a port that has received the GARP message. Then, the update unit 54 stores the transmission source MAC address and the port number in the FDB 52 in association with each other.

For example, it is assumed that a GARP message including the transmission source MAC address "00:11:22:33:44:55" is received by the port having a port number "10" at 12:30 on Oct. 15, 2013. In this case, the update unit 54 refers to an entry of the FDB 52, which corresponds to the transmission source MAC address "00:11:22:33:44:55", and determines that the port number of the identified entry is "10", that is, the identified entry has the same combination of a transmission source MAC address and a port number as that included in the received GARP message. Thus, the update unit 54 updates the entry with "12:30 on Oct. 15, 2013" which is the reception time of the current GARP message.

Further, it is assumed that a GARP message including a transmission source MAC address "aa:bb:22:33:44:55" is received at a port having a port number "30" at 11:30 on Oct. 15, 2013. In this case, the update unit 54 determines that an entry that corresponds to the transmission source MAC address "aa:bb:22:33:44:55" is not stored in the FDB 52. As a result, the update unit 54 adds an entry in which the transmission source MAC address "aa:bb:22:33:44:55", the reception port number "30", and the reception time "201310151130" are associated with one another, to the FDB 52.

Figure 6:
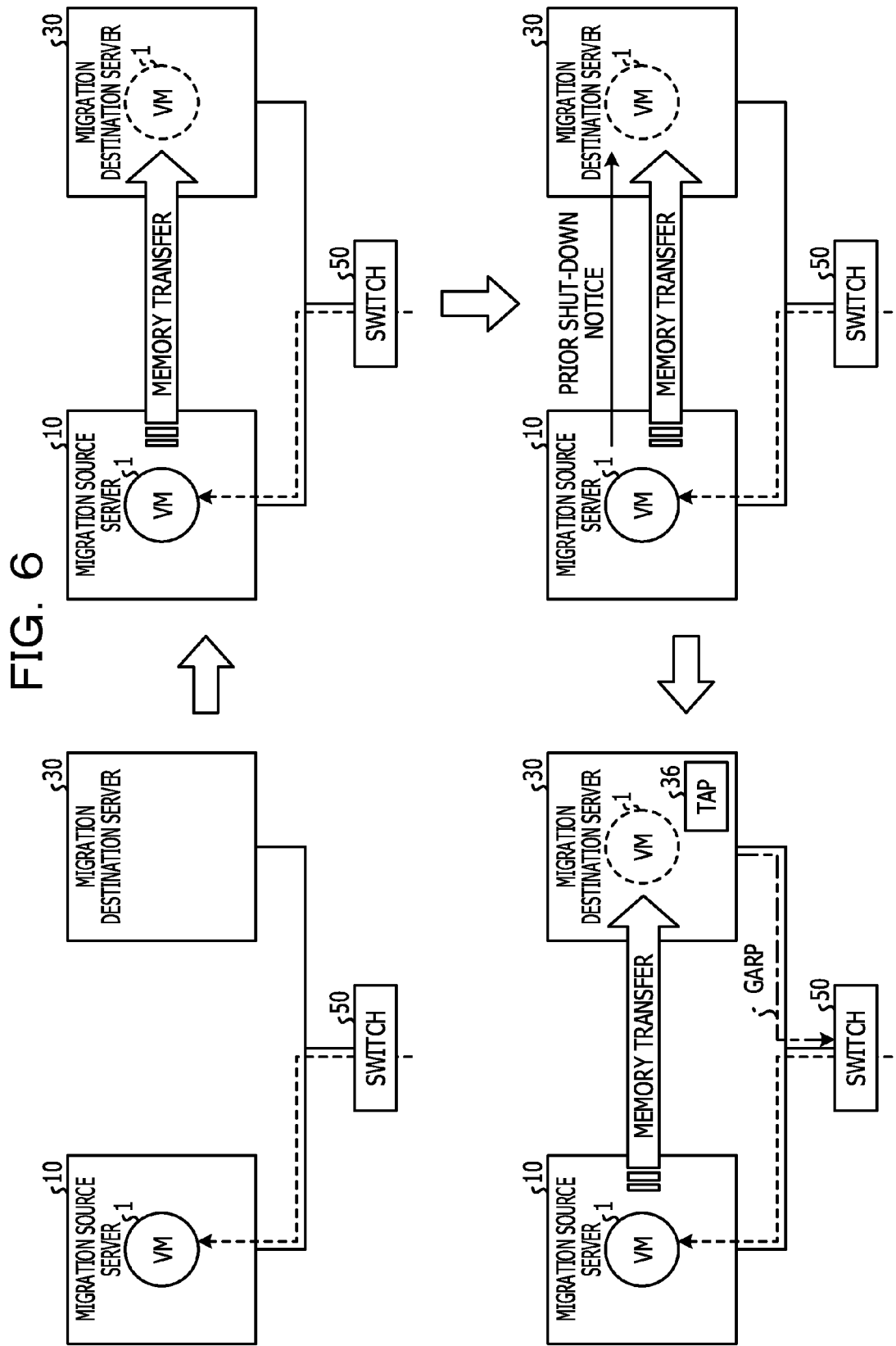
FIG. 6 is a diagram illustrating a flow from the start of VM migration to transmission of a GARP.
Figure 7:
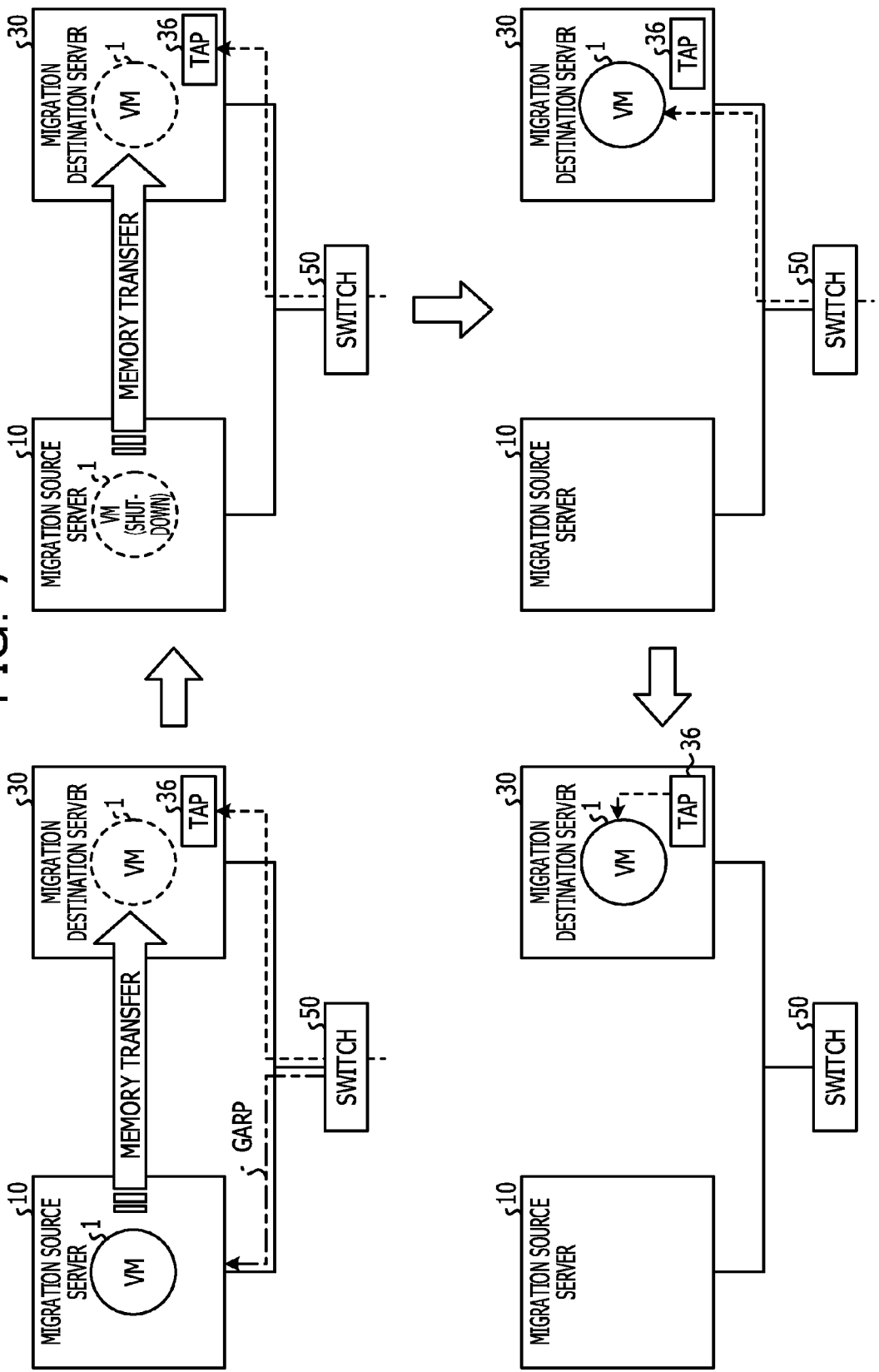
FIG. 7 is a diagram illustrating a flow until the completion of VM migration after the transmission of the GARP.

A specific example of VM migration is described below. FIG. 6 is a diagram illustrating a flow from the start of VM migration to transmission of a GARP, and FIG. 7 is a diagram illustrating a flow until the completion of VM migration after the transmission of the GARP.

As illustrated in the upper left of FIG. 6, at the stage before migration, the migration source server 10 runs the VM 1. The migration source server 10 and the migration destination server 30 are connected to each other through the switch 50. In such a state, upon receiving a packet destined for the VM 1 from the outside, the switch 50 transfers the received packet to the migration source server 10, with reference to the FDB 52.

As illustrated in the upper right of FIG. 6, when migration of the VM 1 is started, the migration source server 10 starts memory transfer. For example, the migration source server 10 transfers the memory data corresponding to the VM 1 to the migration destination server 30. The FDB 52 of the switch 50 is not updated, so that a packet destined for the VM 1 is transferred to the migration source server 10.

As illustrated in the lower right of FIG. 6, when an accumulated data amount of the memory transfer exceeds the first threshold, the migration source server 10 transmits a prior shut-down notice to the migration destination server 30. At this time, the migration source server 10 causes the VM 1 to stop packet transmission.

As illustrated in the lower left of FIG. 6, upon receiving the prior shut-down notice, the migration destination server 30 generates a TAP 36, and transmits a GARP message including a MAC address of the VM 1 to the switch 50 and the migration source server 10.

As illustrated in the upper left of FIG. 7, the switch 50 transfers the GARP message received from the migration destination server 30 to the migration source server 10. In addition, the switch 50 updates the FDB 52 with a combination of a port number of a port that has received the GARP message and the MAC address of the VM 1 included in the GARP message. As a result, upon receiving a packet destined for the VM 1 from the outside, the switch 50 transfers the received packet to the migration destination server 30. Upon receiving the packet destined for the VM 1, the migration destination server 30 holds the received packet in the TAP 36.

As illustrated in the upper right of FIG. 7, after receiving the GARP message, the migration source server 10 shuts down the VM 1 upon determining that the accumulated data amount of the memory transfer exceeds the second threshold. Upon shutting down the VM 1, the migration source server 10 transmits remaining memory data and information indicating completion of memory transfer to the migration destination server 30.

As illustrated in the lower right of FIG. 7, upon receiving the information indicating completion of memory transfer from the migration source server 10, the migration destination server 30 starts up the migrated VM 1 and starts packet transmission of the VM 1.

As illustrated in the lower left of FIG. 7, the migration destination server 30 outputs the packets held in the TAP 36 to the started-up VM 1. As a result, the migration of the VM 1 is completed in the migration destination server 30 and the VM 1 may start packet processing without delay after the migration.

A flow of processing related to VM migration is described below with reference to FIGS. 8 and 9. Here, processing performed by the migration source server 10 and processing performed by the migration destination server 30 are described.

Figure 8:
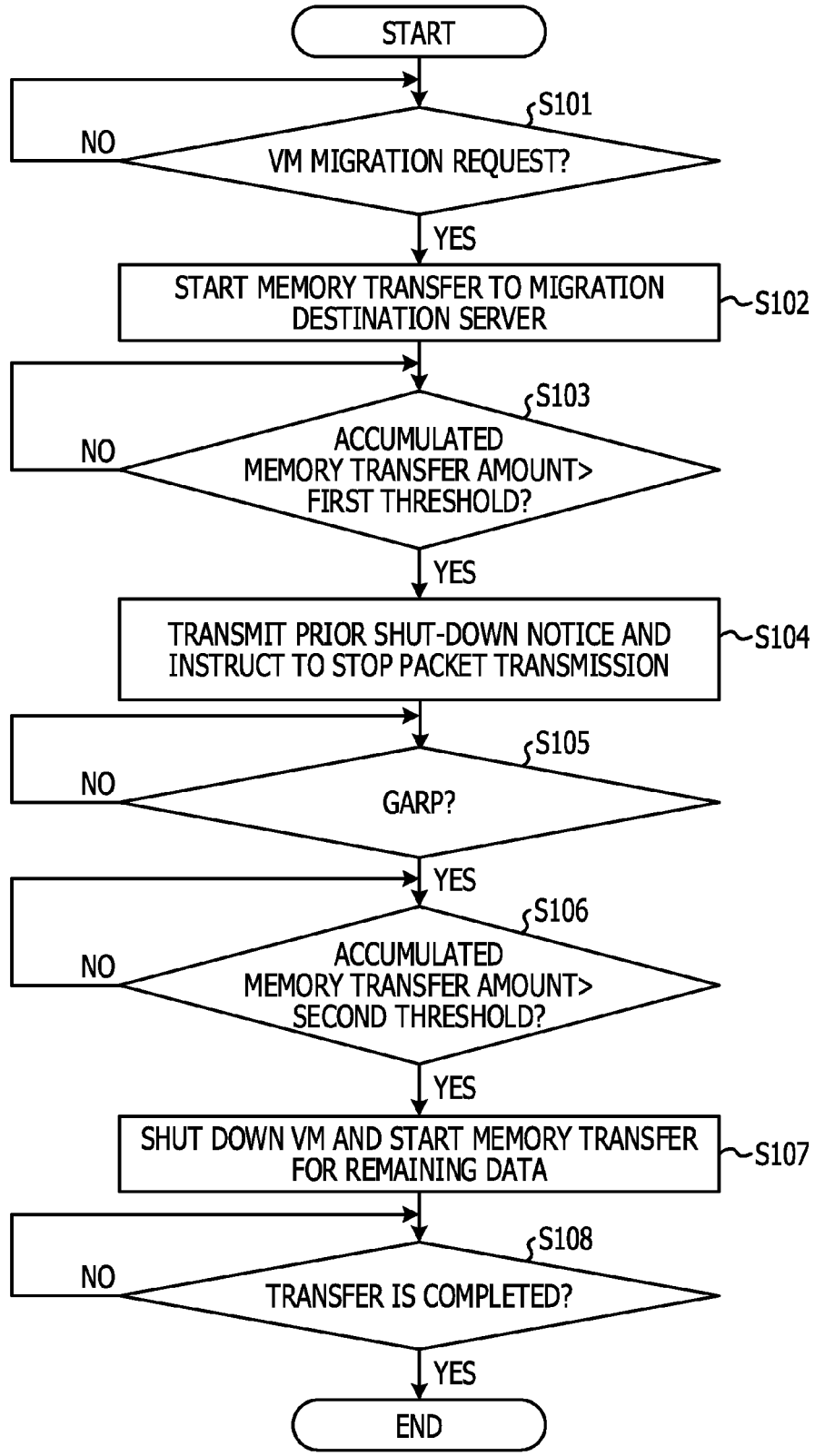
FIG. 8 is a flowchart illustrating a flow of processing performed by a migration source server.

FIG. 8 is a flowchart illustrating a flow of the processing performed by the migration source server. As illustrated in FIG. 8, when a migration request for requesting migration of a VM occurs (S101: Yes), the memory transfer unit 14 of the migration source server 10 starts memory transfer of the VM to be migrated to the migration destination server 30 (S102).

When the accumulated memory transfer amount exceeds the first threshold (S103: Yes), the prior notice transmission unit 15 of the migration source server 10 transmits prior shut-down notice to the migration destination server 30, and instructs the VM to be migrated to stop packet transmission (S104).

When the migration management unit 16 receives a GARP message including a MAC address of the VM (S105: Yes), and the accumulated memory transfer amount exceeds the second threshold (S106: Yes), the VM shut-down unit 17 shuts down the VM, and starts memory transfer for remaining memory data, that is, memory data which is not yet transferred, to the migration destination server 30 (S107).

When transfer of all pieces of memory data is completed (S108: Yes), the VM shut-down unit 17 ends the processing. At this time, the VM shut-down unit 17 may transmit completion notification of the memory transfer to the migration destination server 30.

Figure 9:
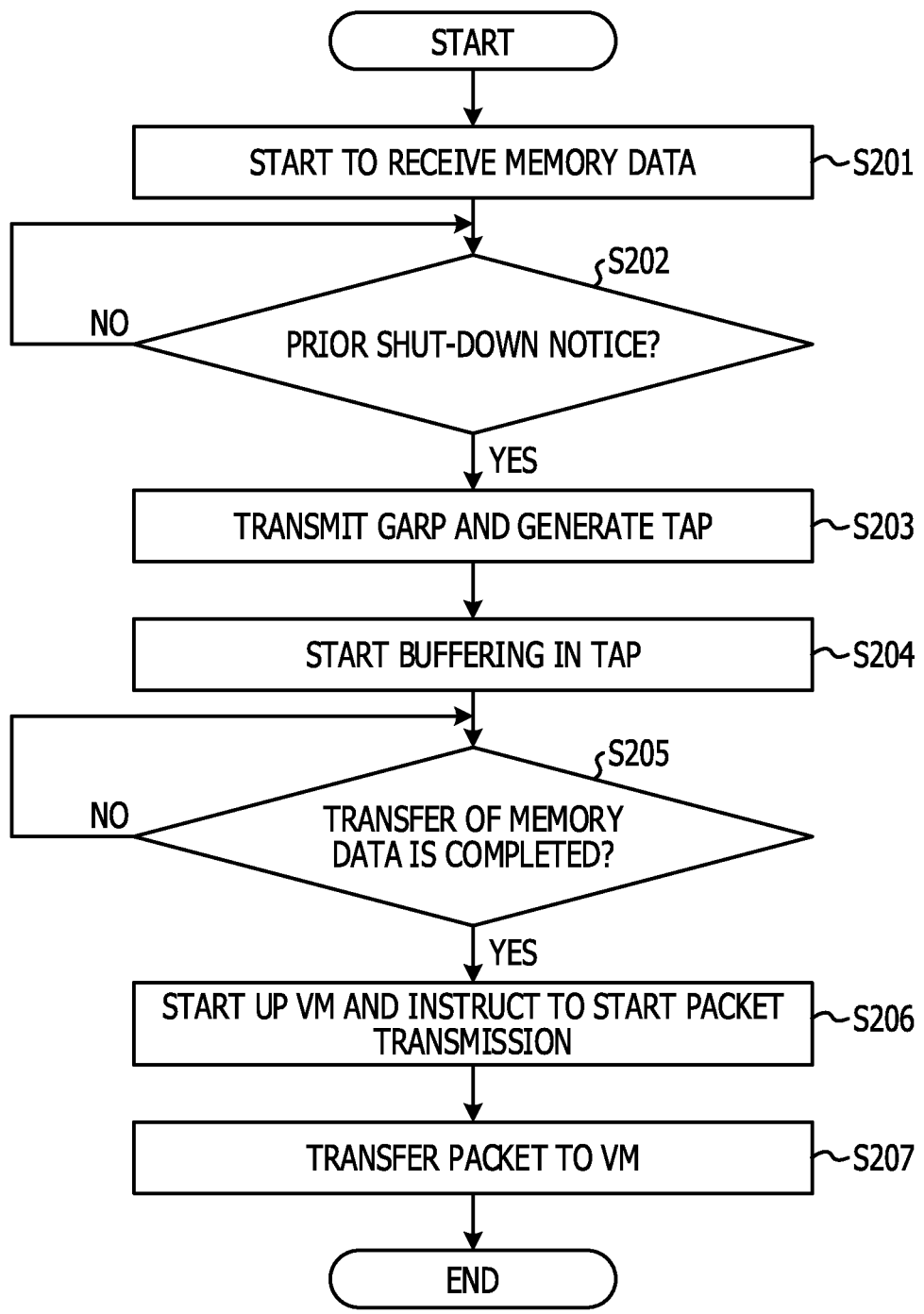
FIG. 9 is a flowchart illustrating a flow of processing performed by a migration destination server.

FIG. 9 is a flowchart illustrating a flow of the processing performed by the migration destination server. As illustrated in FIG. 9, when reception of the memory data is started (S201), the memory reception unit 33 of the migration destination server 30 stores the received memory data in the memory.

Upon receiving a prior shut-down notice (S202: Yes), the migration management unit 34 transmits a GARP message including the MAC address of the VM, to the switch 50 and the migration source server 10, and the TAP generation unit 35 generates a TAP 36 (S203).

The migration management unit 34 starts buffering in the TAP 36 (S204). Specifically, upon receiving from the switch 50 a packet destined for the VM to be migrated, the migration management unit 34 holds the received packet in the TAP 36.

After that, when transfer of the memory data is completed (S205: Yes), the VM start-up unit 37 starts up the VM, and instructs the VM to start packet transmission (S206). For example, upon receiving completion notification of the memory transfer or the like, from the migration source server 10, the VM start-up unit 37 starts up the VM.

The VM start-up unit 37 transfers the packet held in the TAP 36 to the started-up VM (S207).

During migration of a VM, the information processing system according to the first embodiment temporarily stores a packet destined for the VM in the migration destination when the memory transfer amount exceeds the first threshold, and starts up the VM in the migration destination when the memory transfer amount exceeds the second threshold. As a result, the information processing system according to the first embodiment may suppress delay in packet processing of the VM after migration.

The information processing system according to the first embodiment, is does not transfer packets destined for the VM between servers during the VM migration, so that drop of the packets destined for the VM may be reduced, and drop of packets originated from the VM may be reduced.

Figure 10:
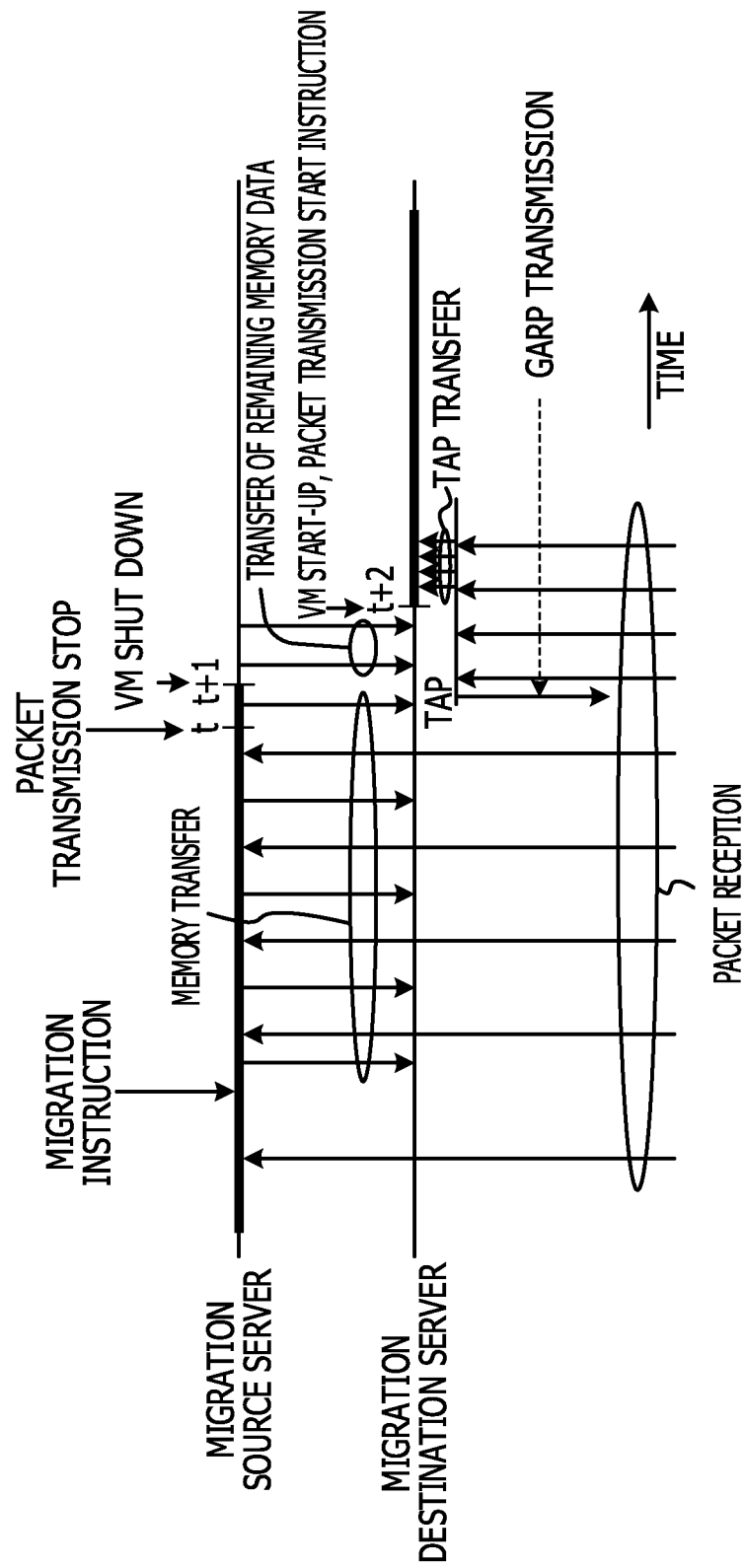
FIG. 10 is a diagram illustrating a flow of packets before and after migration.

FIG. 10 is a diagram illustrating a flow of packets before and after the migration. As illustrated in FIG. 10, the migration source server 10 causes the VM to stop packet transmission when the memory transfer amount exceeds the first threshold at a time t. The migration source server 10 repeats memory transfer until a time t+1 at which the VM is shut down.

The migration destination server 30 receives a prior shut-down notice at the time t, and generates a TAP 36. At the time t, the migration destination server 30 transmits a GARP to the switch 50 and the migration source server 10. The migration destination server 30 holds packets destined for the VM in the TAP 36 until a time t+2 at which the VM is started up.

That is, the VM is not running during a time period from the time t+1 to the time t+2, but packets destined for the VM are held in the TAP 36 even during that time period. Thus, packet discard may be suppressed even when the VM is not running.

Second Embodiment

When the migration of a VM is failed, for example, when an error of the memory transfer or the like is occurred, the migration source server 10 or the migration destination server 30 may perform error processing. Error processing of each server according to a second embodiment is described below.

Figure 11:
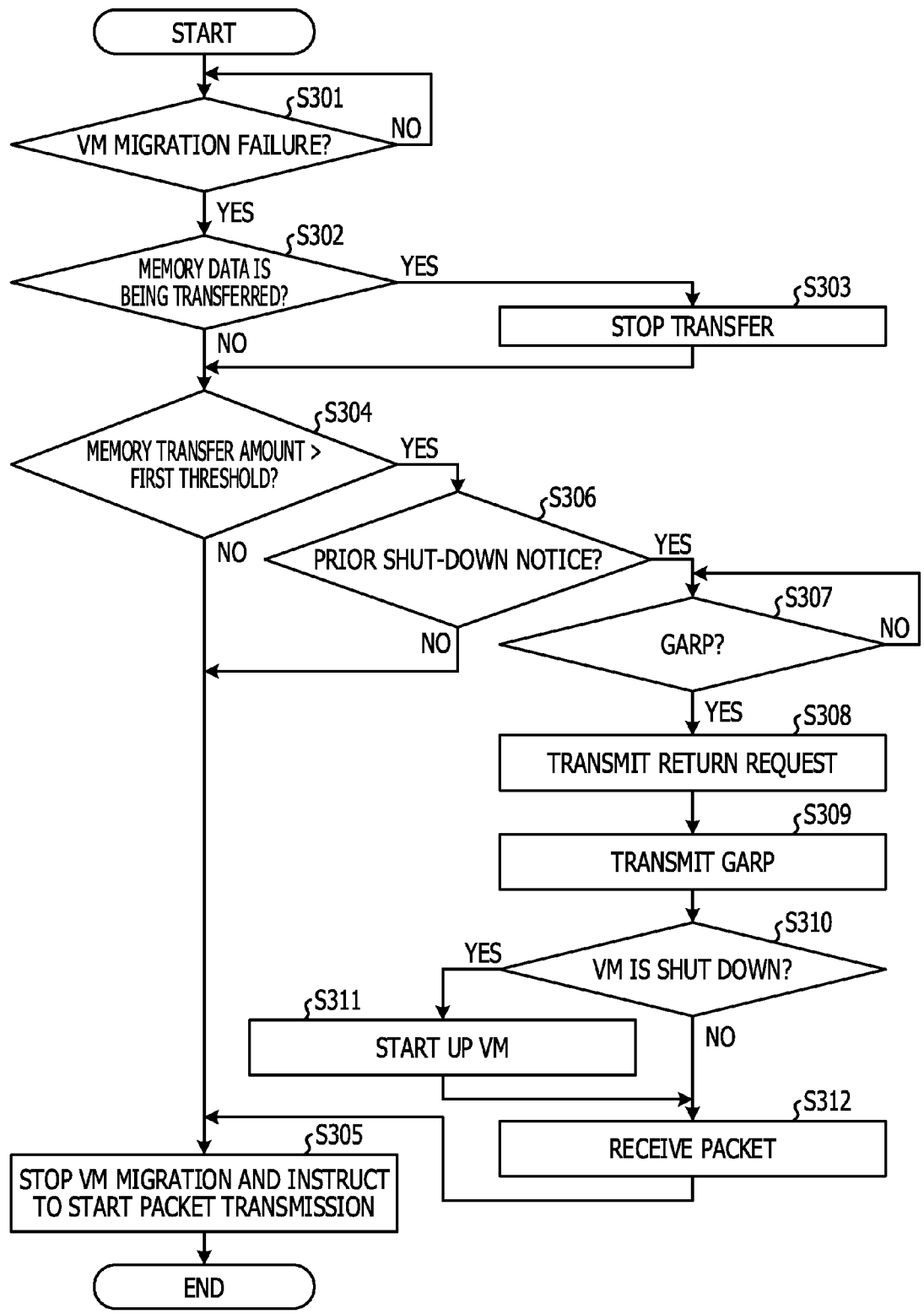
FIG. 11 is a flowchart illustrating a flow of processing when a VM migration failure is detected in the migration source server.

FIG. 11 is a flowchart illustrating a flow of processing when a VM migration failure is detected in the migration source server. As illustrated in FIG. 11, upon detecting a migration failure of the VM (S301: Yes), the migration management unit 16 of the migration source server 10 determines whether or not memory data is being transferred (S302).

For example, the migration management unit 16 detects a migration failure of the VM when a transmission error or a reception error in data transfer, lack of resources in the migration destination, or the like is detected.

When the memory data is being transferred (S302: Yes), the migration management unit 16 stops the transfer of the memory data (S303), and then performs S304. When the memory data is not being transferred (S302: No), the migration management unit 16 performs S304 without performing S303.

When the migration failure of the VM is detected before the memory transfer amount exceeds the first threshold (S304: No), the migration management unit 16 stops the VM migration and causes the VM to start packet transmission (S305). The migration management unit 16 determines that the migration failure of the VM is detected before the memory transfer amount exceeds the first threshold when "0" is set to the corresponding "first flag" column in the VM management table 13.

Upon determining that the migration failure of the VM is detected after the memory transfer amount has exceeded the first threshold (S304: Yes) and before transmission of a prior shut-down notice (S306: No), the migration management unit 16 stops the VM migration and causes the VM to start packet transmission (S305).

Upon determining that the migration failure of the VM is detected after the memory transfer amount has exceeded the first threshold (S304: Yes) and after transmission of a prior shut-down notice (S306: Yes), the migration management unit 16 waits until a GARP message is received (S307).

Upon receiving a GARP message transmitted from the migration destination server 30 (S307: Yes), the migration management unit 16 transmits a return request for returning packets, to the migration destination server 30 (S308). That is, the migration management unit 16 requests the migration destination server 30 to transfer the packets stored in the TAP 36.

The migration management unit 16 transmits a GARP message including a MAC address of the VM, to the switch 50 and the migration destination server 30 (S309). Due to the GARP message, the switch 50 updates the FDB 52 so that packets destined for the VM are relayed to the migration source server 10 again.

When the VM is shut down (S310: Yes), the migration management unit 16 starts up the VM (S311), and then performs S312. When the VM is not shut down (S310: No), the migration management unit 16 performs S312 without performing S311.

The migration management unit 16 receives, from the migration destination server 30, the packets requested to be returned in S308 (S312). The migration management unit 16 stops the VM migration, and causes the VM to start packet transmission (S305).

Figure 12:
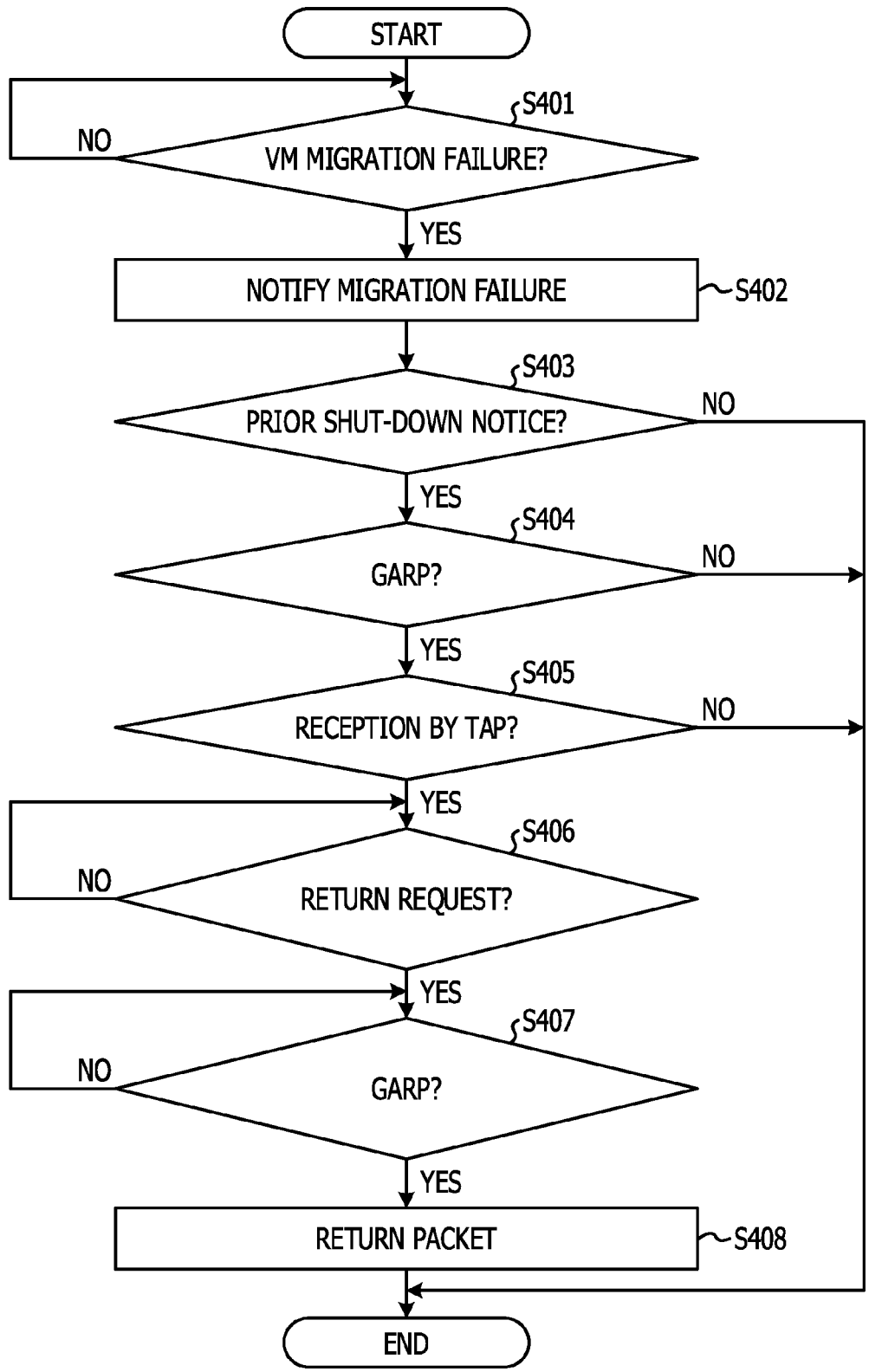
FIG. 12 is a flowchart illustrating a flow of processing when a VM migration failure is detected in the migration destination server.

FIG. 12 is a flowchart illustrating a flow of processing when a VM migration failure is detected in the migration destination server. As illustrated in FIG. 12, upon detecting a migration failure of the VM (S401: Yes), the migration management unit 34 of the migration destination server 30 notifies the migration source server 10 of the migration failure of the VM (S402).

When the migration management unit 34 does not receive a prior shut-down notice yet (S403: No), the migration management unit 34 ends the processing. When the migration management unit 34 has already received a prior shut-down notice (S403: Yes), the migration management unit 34 determines whether or not transmission of a GARP message has been performed (S404).

When the transmission of a GARP message is not performed yet (S404: No), the migration management unit 34 ends the processing. When the transmission of a GARP message has been already performed (S404: Yes), the migration management unit 34 determines whether or not reception of packets by the TAP 36 is started (S405).

When the reception of packets by the TAP 36 is not yet started (S405: No), the migration management unit 34 ends the processing. When the reception of packets by the TAP 36 has been already started (S405: Yes), the migration management unit 34 waits until a return request is received from the migration source server 10 (S406).

Upon receiving a return request from the migration source server 10 (S406: Yes) and receiving a GARP message including a MAC address of the VM from the migration source server 10 (S407: Yes), the migration management unit 34 performs S408. That is, the migration management unit 34 returns the packets held in the TAP 36 to the migration source server 10.

As described above, the migration source server 10 and the migration destination server 30 may change processing performed at the time of occurrence of an error, depending on the timing at which the error has been detected. Thus, even when a migration failure of the VM occurs, the migration source server 10 and the migration destination server 30 may recover the state of the VM so that the packet communication may be performed in the VM, while reducing discard of packets. In addition, since the state of the VM may be recovered, the service by the VM may be continued while reducing the down time of the service as much as possible.

Third Embodiment

Figure 13:
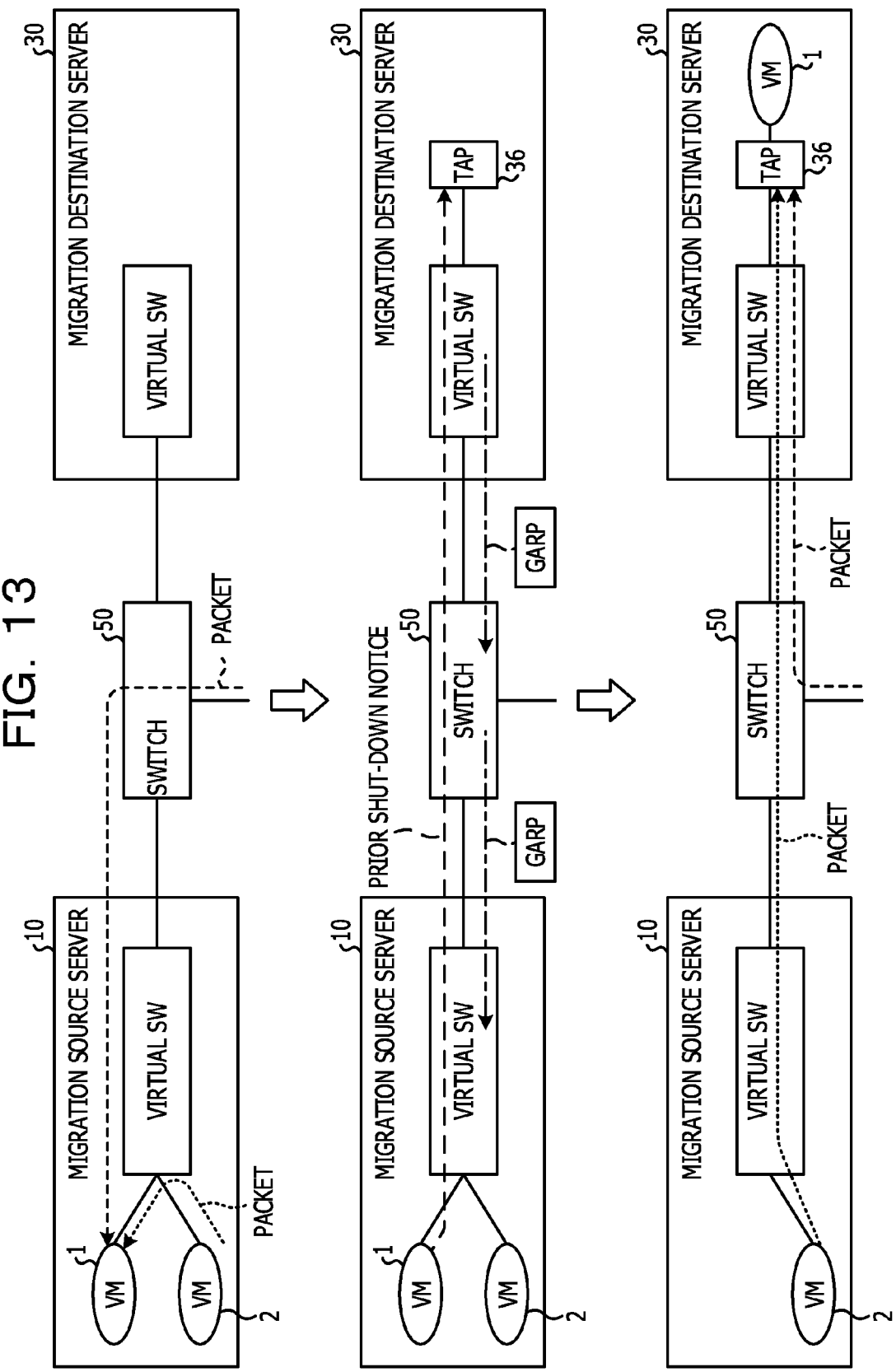
FIG. 13 is a diagram illustrating processing when a virtual machine is migrated in a situation in which a plurality of virtual machines communicate with each other in the migration source server.

In the above-described embodiments, a single VM is operated in the migration source server. However, the embodiments are not limited to such a situation. For example, even when a plurality of VMs are running on the migration source server 10, the processing may be performed in a similar manner. FIG. 13 is a diagram illustrating processing when a VM is migrated in a situation in which communications of a plurality of VMs are performed in the migration source server.

As illustrated in the top third of FIG. 13, a VM 1 and a VM 2 are running on the migration source server 10 in this example, and each of the VMs performs communication through a virtual SW. The switch 50 transmits a packet destined for the VM 1, which has received from the outside, to the VM 1 through the virtual SW. The switch 50 and the virtual SW include respective FDBs. An example is described below in which the VM 1 is migrated to the migration destination server 30 in such a situation.

As illustrated in the middle third of FIG. 13, when a memory transfer amount exceeds the first threshold, the migration source server 10 transmits a prior shut-down notice to the migration destination server 30. Upon receiving the prior shut-down notice, the migration destination server 30 generates a TAP 36 for the VM 1, and transmits a GARP message including a MAC address of the VM 1, to the switch 50 and the migration source server 10.

The switch 50 changes, in its own FDB, the output destination of packets destined for the VM 1 to the migration destination server 30 in accordance with the GARP message transmitted from the migration destination server 30. The virtual SW in the migration source server 10 also changes, in its own FDB, the output destination of packets destined for the VM 1 to the migration destination server 30 in accordance with the GARP message transmitted from the migration destination server 30.

As a result, as illustrated in the bottom third of FIG. 13, a packet transmitted from the VM 2 to the VM 1 is relayed to the switch 50 through the virtual SW in the migration source server 10, and the switch 50 relays the packet to the migration destination server 30. In addition, upon receiving a packet destined for the VM 1 from the outside, the switch 50 relays the received packet to the migration destination server 30. The migration destination server 30 holds the packet destined for the VM 1, which has been relayed by the switch 50, in the TAP 36 for the VM 1. The subsequent processing is similar to that of the first embodiment, so that the description is omitted herein.

As described above, upon receiving a GARP message, the virtual SW in the migration source server 10 may rewrite its own FDB in accordance with the received GARP message. Thus, upon receiving, from another VM running on the same server on which the VM to be migrated is running, a packet destined for the VM to be migrated, the virtual SW may relay the packet to the migration destination server. As a result, the migration of a VM may be performed while suppressing discard of packets due to the migration of the VM.

Other Embodiments

Some embodiments are described above, but other embodiments may be implemented in various different ways in addition to the above-described embodiments. Therefore, different embodiments are described below.

The above-described first threshold and second threshold may be of the same value, and determination of whether or not the accumulated memory transfer amount exceeds the threshold is performed twice even in that case. When a small value is set to the first threshold, a buffer amount of the migration destination server 30 becomes large. Therefore, it is preferable to set the first threshold in consideration of an amount of memory data to be transferred.

For example, when there is much leeway in the memory of the migration destination server 30, a small value such as 10% of the total amount of memory data to be transferred is set to the first threshold. With this, transfer of packets destined for the VM to be migrated to the migration destination server 30 may be advanced, and thus the packet discard may be further reduced.

When there is small leeway in the memory of the migration destination server 30, a large value such as 80% of the total amount of memory data to be transferred is set to the first threshold. With this, the buffer capacity secured in the migration destination server 30 may be reduced.

All or a part of the pieces of processing described above as performed automatically may be performed manually. Alternatively, all or a part of the pieces of processing described above as performed manually may be performed automatically by a known method. Information including the processing procedure, the control procedure, the specific name, and various pieces of data and parameters described in the above-described specification and drawings may be changed arbitrary except otherwise specified.

In addition, the configuration elements in each of the illustrated devices are functional and conceptual elements, and may not be configured as physically illustrated in the drawings. That is, the specific form of distribution and integration of the devices is not limited to the illustrated drawings. All or a part of the devices may be configured so as to be functionally or physically distributed or integrated in a given unit, depending on various loads and usages. In addition, all or a given part of the processing functions that are performed in each of the devices may be implemented by a CPU and a program that is analyzed and executed by the CPU, or may be implemented as hardware by wired logic.

An exemplary hardware configuration of each of the servers is described below. The migration source server 10, the migration destination server 30, and the switch 50 have similar hardware configurations, so that a server 100 is described as an example herein.

Figure 14:
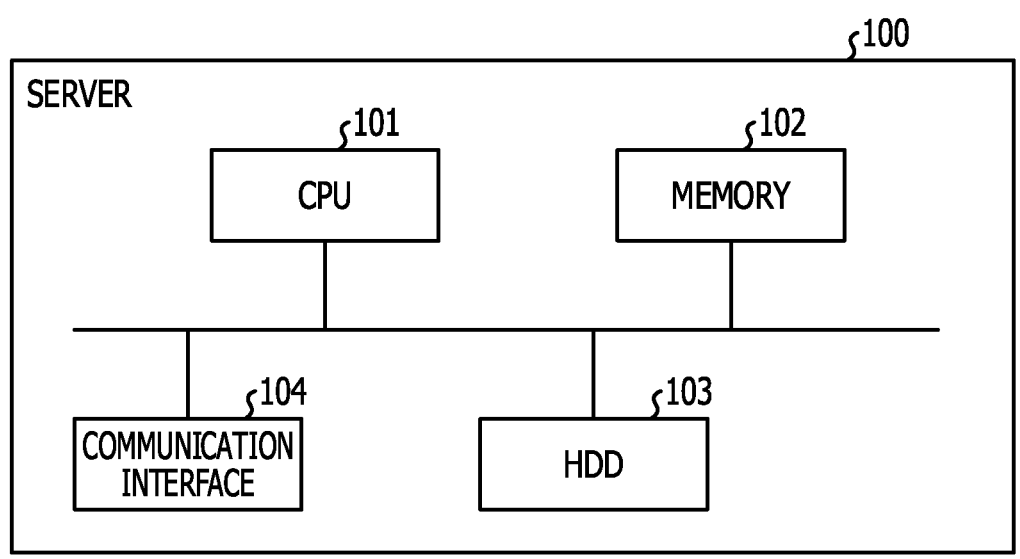
FIG. 14 is a diagram illustrating an exemplary hardware configuration.

FIG. 14 is a diagram illustrating an exemplary hardware configuration. As illustrated in FIG. 14, the server 100 includes a CPU 101, a memory 102, a hard disk drive (HDD) 103, and a communication interface 104 connected to each other through a bus or the like.

The communication interface 104 is a network interface card or the like. The HDD 103 stores, the table, the DB, and a program that cause the CPU 101 to perform the functions of the processing units illustrated in FIG. 3.

The CPU 101 executes the processes for the functions described above with reference to FIG. 3 and the like by reading the program from the HDD 103 or the like and loading the program to the memory 102.

For example, the CPU 101 executes the processes for the functions similar to those of the processing units included in the migration source server 10. For example, the CPU 101 reads a program for performing functions similar to those of the memory transfer unit 14, the prior notice transmission unit 15, the migration management unit 16, and the VM shut-down unit 17 from the HDD 103 or the like. Then, the CPU 101 executes the processes for the functions similar to those of the memory transfer unit 14, the prior notice transmission unit 15, the migration management unit 16, and the VM shut-down unit 17.

As described above, the server 100 operates as an information processing device that executes a method for migrating a VM by reading and executing a program. In addition, the server 100 may also perform functions similar to those of the above-described embodiments by reading the above-described program from a computer-readable recording medium with a medium reading device, and executing the read program. The execution of the program in the embodiments is not limited to execution by the server 100. For example, even when the program is executed by another computer or server, or when the program is executed in cooperation with another computer and server, the embodiments may be applied in the similar manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
  a first information processing device; and
  a second information processing device connected to the first information processing device via a switch device,
  wherein the first information processing device includes a first processor, for performing migration of a virtual machine running on the first information processing device to the second information processing device to create a migrated virtual machine running on the second information processing device, configured to
    start memory transfer for transferring memory data of the virtual machine to the second information processing device,
    stop, when an accumulated amount of transferred memory data exceeds a first threshold, packet transmission performed by the virtual machine and transmit a prior shut-down notice to the second information processing device, the prior shut-down notice notifying that the virtual machine is to be shut-down,
    receive a first control message including address information of the virtual machine running on the first information processing device, and
    shut down the virtual machine running on the first information processing device when the accumulated amount exceeds a second threshold, and
  wherein the second information processing device includes a second processor configured to
    transmit, upon receiving the prior shut-down notice from the first information processing device, the first control message to the switch device and the first information processing device,
    cause a virtual network interface to start reception of packets destined for the virtual machine,
    start up, when the memory transfer is completed, the migrated virtual machine to start the packet transmission, and
    output packets held in the virtual network interface to the migrated virtual machine.

2. The information processing system according to claim 1, wherein the first processor is further configured to
  stop, upon detecting an error in the memory transfer during a first time period or a second time period, the migration and start packet transmission performed by the virtual machine, the first time period being before a first time point at which the accumulated amount exceeds the first threshold, the second time period being after the first time point and before a second time point at which the prior shut-down notice is transmitted.

3. The information processing system according to claim 1, wherein the first processor is further configured to
  transmit, upon detecting an error in the memory transfer after the prior shut-down notice has been transmitted, a second control message including the address information of the virtual machine to the switch device and transmit to the second information processing device a transfer request for requesting transfer of packets held in the virtual network interface.

4. The information processing system according to claim 1, wherein the second processor is further configured to
  notify, upon detecting an error in the migration, the first information processing device of the error, and
  transmit, upon receiving a transfer request and a second control message from the first information processing device, packets held in the virtual network interface to the first information processing device, the transfer request requesting transfer of the packets held in the virtual network interface, the second control message including the address information of the virtual machine.

5. A computer-readable recording medium having stored therein a program for causing a computer to execute a process for performing migration of a virtual machine running on the computer to an information processing device to create a migrated virtual machine running on the information processing device, the computer being connected to the information processing device via a switch device, the process comprising:
  starting memory transfer for transferring memory data of the virtual machine to the information processing device;
  stopping, when an accumulated amount of transferred memory data exceeds a first threshold, packet transmission performed by the virtual machine and transmitting a prior shut-down notice to the information processing device, the prior shut-down notice notifying that the virtual machine is to be shut-down;

receiving a control message including address information of the virtual machine running on the computer;

shutting down the virtual machine running on the computer when the accumulated amount exceeds a second threshold;

starting reception of memory data of the virtual machine running on the computer connected to the information processing device connected via the switch device;

transmitting, upon receiving the prior shut-down notice from the computer, a control message to the switch device and the computer, the prior shut-down notice notifying that the virtual machine running on the computer is to be shut-down, the control message including address information of the virtual machine running on the computer;

causing a virtual network interface to start reception of packets destined for the virtual machine;

starting up, when the memory transfer is completed, the migrated virtual machine to start packet transmission, and outputting packets held in the virtual network interface to the migrated virtual machine.

* * * * *